United States Patent
Motoki

(10) Patent No.: US 9,742,297 B2
(45) Date of Patent: Aug. 22, 2017

(54) POWER DELIVERY DEVICE, AC ADAPTER AND ELECTRONIC APPARATUS

(71) Applicant: ROHM CO., LTD., Kyoto (JP)

(72) Inventor: Kenichi Motoki, Kyoto (JP)

(73) Assignee: ROHM CO. LTD, Kyoto (JP)

( * ) Notice: Subject to any disclaimer, the term of this patent is extended or adjusted under 35 U.S.C. 154(b) by 136 days.

(21) Appl. No.: 14/469,035

(22) Filed: Aug. 26, 2014

(65) Prior Publication Data

US 2015/0055380 A1 Feb. 26, 2015

(30) Foreign Application Priority Data

Aug. 26, 2013 (JP) .................................. 2013-174122

(51) Int. Cl.
- *H02M 3/335* (2006.01)
- *H02M 1/10* (2006.01)
- *H02M 1/00* (2006.01)

(52) U.S. Cl.
CPC ......... *H02M 3/33561* (2013.01); *H02M 1/10* (2013.01); *H02M 2001/007* (2013.01)

(58) Field of Classification Search
CPC .... H02M 3/335; H02M 3/33561; H02M 1/10; H02M 2001/007; H02M 5/04;

(Continued)

(56) References Cited

U.S. PATENT DOCUMENTS 5,991,171 A * 11/1999 Cheng ............... H02M 3/33507
363/21.03
8,193,738 B2 * 6/2012 Chu .................... H05B 33/0815
315/307

(Continued)

FOREIGN PATENT DOCUMENTS

JP H01318549 A 12/1989
JP 2006109605 A 4/2006

(Continued)

OTHER PUBLICATIONS

"Special Edition: Power Delivery through Data Lines", Nikkei Electronics, Oct. 9, 2012, pp. 23-40; with English Translation.

(Continued)

*Primary Examiner* — Fred E Finch, III
*Assistant Examiner* — Lorena Bruner
(74) *Attorney, Agent, or Firm* — Cantor Colburn LLP

(57) ABSTRACT

A power delivery (PD) device includes: an AC/DC converter connected to an AC input, the AC/DC converter configured to change the AC input to a desired voltage value to be output in accordance with a first voltage changing control signal supplied from outside; and a DC/DC converter connected between an output of the AC/DC converter and a DC output, the DC/DC converter configured to change the output from the AC/DC converter to a desired voltage value to be output as a DC output in accordance with a second voltage changing control signal supplied from outside, wherein the AC/DC converter at a previous stage and the DC/DC converter at a subsequent stage are interlocked to change the output voltage to desired target voltage. There can be provided the PD device capable of delivering power with high power efficiency over the wide voltage ranges.

6 Claims, 10 Drawing Sheets

(58) Field of Classification Search
CPC ...... H02M 3/335922; H02M 2001/009; G05F 1/14; G05F 1/147
USPC ..................................................... 363/21.12
See application file for complete search history.

(56) References Cited

U.S. PATENT DOCUMENTS

| | | | | |
|---|---|---|---|---|
| 8,446,628 B2* | 5/2013 | Kashimoto | ............ | G06K 15/02 |
| | | | | 358/1.16 |
| 2012/0257421 A1* | 10/2012 | Brkovic | .................. | H01F 27/38 |
| | | | | 363/21.07 |
| 2012/0262950 A1* | 10/2012 | Nate | ........................ | H02J 9/005 |
| | | | | 363/16 |
| 2014/0313794 A1* | 10/2014 | Ono | .................. | H02M 3/33523 |
| | | | | 363/21.15 |

FOREIGN PATENT DOCUMENTS

| JP | 2010263739 A | 11/2010 |
|---|---|---|
| JP | 2011082802 A | 4/2011 |
| JP | 2013062947 A | 4/2013 |

OTHER PUBLICATIONS

Notification of Reasons for Refusal corresponding to JP Application No. 2013-174122; dated May 9, 2017.

* cited by examiner

POWER DELIVERY DEVICE, AC ADAPTER AND ELECTRONIC APPARATUS

CROSS REFERENCE TO RELATED APPLICATIONS

This application is based upon and claims the benefit of priority from prior Japanese Patent Application No. P2013-174122 filed on Aug. 26, 2013, the entire contents of which are incorporated herein by reference.

FIELD

Embodiments described herein relate to a power delivery (PD) device, an AC adapter, and an electronic apparatus.

BACKGROUND

Conventionally, there have been provided direct current (DC) power sockets which can intercommunicate between terminal devices and power line carrier communication networks supporting telecommunications standards with the PD.

There are Power over Ethernet (PoE) technology and Universal Serial Bus (USB) technology as a PD technology using data lines.

As the USB technologies, there are USB 2.0 Standard up to maximum supply power of 2.5 W, USB 3.0 Standard up to maximum supply power of 4.5 W, and Battery Charging Standard (BCS) Revision 1.2 up to maximum supply power of 7.5 W according to the PD level.

Moreover, a USB Power Delivery (USB-PD) Specification Revision 1.0 is compatible with existing cables and existing connectors, and coexists also with the USB 2.0 Standard, the USB 3.0 Standard, and the USB-BCS Revision 1.2. In such a specification, values of the charging current and voltage is selectable within a range of voltage 5V-12V-20V and a range of current 1.5 A-2 A-3 A-5 A, and the USB electric charging and power transmission can be achieved to be 10 W, 18 W, 36 W, 65 W, and the maximum of 100 W.

DC/DC converters have been used as a power source for achieving such a PD, and insulated DC/DC converters (e.g., flyback converters, forward converters) have been used for such a DC/DC converter, for example.

SUMMARY

In general, if voltage is changed to desired voltage within a range from 10 W to 100 W, for example, the power efficiency may become deteriorated due to an output voltage, therefore it is required to deliver the power with high power efficiency over wide voltage ranges.

The embodiments described herein provide a PD device capable of delivering power with high power efficiency over wide voltage ranges, and further provides an AC adapter and an electronic apparatus, each mounted with such a PD device.

According to one aspect of the embodiments, there is provided a PD device comprising: an AC/DC converter connected to an AC input, the AC/DC converter configured to change the AC input to a desired voltage value to be output in accordance with a first voltage changing control signal; and a DC/DC converter connected between an output of the AC/DC converter and a DC output, the DC/DC converter configured to change the output of the AC/DC converter to desired voltage value to be output as a DC output in accordance with a second voltage changing control signal, wherein the AC/DC converter and the DC/DC converter are interlocked with each other to change the output voltage to desired target voltage.

According to another aspect of the embodiments, there is provided a PD device comprising: an AC/DC converter connected to an AC input, AC/DC converter configured to change the AC input to a predetermined number of desired voltage values to be output to multiport outputs in accordance with a first voltage changing control signal; and a DC/DC converter connected between the multiport outputs of the AC/DC converter and a DC output, the DC/DC converter configured to selectively input optimum voltage from among the multiport outputs of the AC/DC converter, and then change the optimum voltage to desired voltage value to be output as a DC output in accordance with a second voltage changing control signal, wherein the AC/DC converter and the DC/DC converter are interlocked with each other to change the output voltage to desired target voltage.

According to still another aspect of the embodiments, there is provided a PD device comprising: an AC/DC converter connected to an AC input, the AC/DC converter configured to change the AC input to a predetermined number of predetermined voltage values to be output to multiport outputs; and a DC/DC converter connected between the multiport outputs of the AC/DC converter and a DC output, the DC/DC converter configured to selectively input optimum voltage from among the multiport outputs of the AC/DC converter, and then change the optimum voltage to desired voltage value to be output as a DC output in accordance with a second voltage changing control signal, wherein the AC/DC converter and the DC/DC converter are interlocked with each other to change the output voltage to desired target voltage.

According to still another aspect of the embodiments, there is provided an AC adapter comprising the above-mentioned PD device.

According to still another aspect of the embodiments, there is provided an electronic apparatus comprising the above-mentioned PD device.

According to the embodiments, there can be provided the PD device capable of delivering power with high power efficiency over wide voltage ranges, and can further be provided the AC adapter and the electronic apparatus, each mounted with such a PD device.

DESCRIPTION OF EMBODIMENTS

Figure 1:
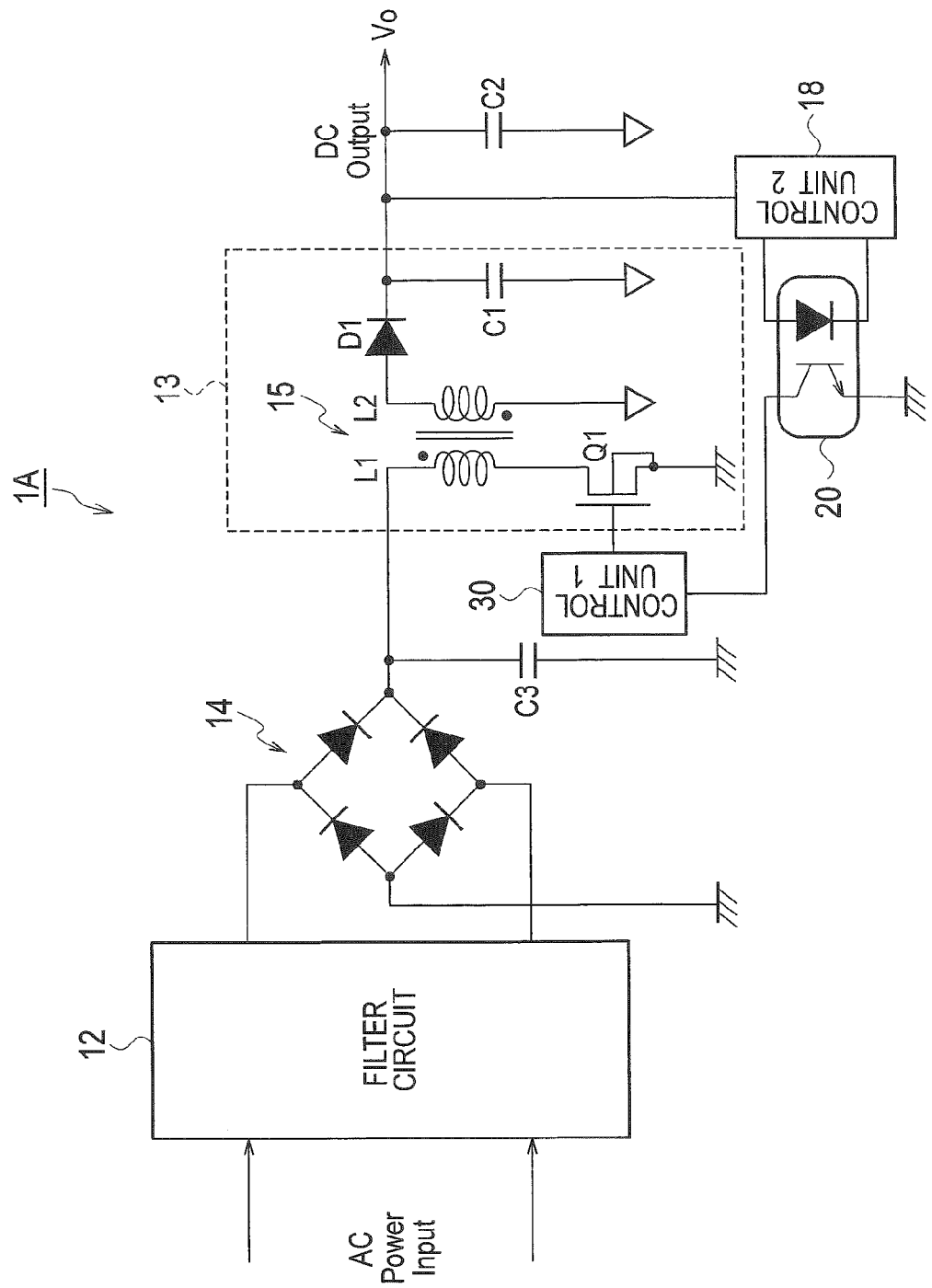
FIG. 1 is a schematic circuit block configuration diagram of a PD device according to a comparative example 1.

Next, certain embodiments will be described with reference to drawings. In the description of the following drawings, the identical or similar reference numeral is attached to the identical or similar part. However, it should be noted that the drawings are schematic and therefore the relation between thickness and the plane size and the ratio of the thickness differs from an actual thing. Therefore, detailed thickness and size should be determined in consideration of the following explanation. Of course, the part from which the relation and ratio of a mutual size differ also in mutually drawings is included.

Moreover, the embodiments shown hereinafter exemplify the apparatus and method for materializing the technical idea; and the embodiments do not specify the material, shape, structure, placement, etc. of each component part as the following. The embodiments may be changed without departing from the spirit or scope of claims.

Comparative Example 1

As exemplified in FIG. 1, a PD device 1A according to a comparative example 1 includes: a flyback-type DC/DC converter 13 disposed between an AC input and a DC output, the DC/DC converter 13 composed of a transformer 15, a diode D1, a capacitor C1, and a MOS transistor Q1, the MOS transistor Q1 connected in series between a primary-side inductance L1 of the transformer 15 and a ground potential; a control unit 1 (reference numeral 30) configured to control the MOS transistor Q1; an AC/DC converter connected between the AC input and the control unit 1 (reference numeral 30), the AC/DC converter configured to supply power to the control unit 1 (reference numeral 30); a control unit 2 (reference numeral 18) connected between the output of the DC/DC converter 13 and the DC output, the control unit 2 configured to execute voltage changing control; and an insulation circuit 20 connected to the control unit 2 (reference numeral 18), the insulation circuit 20 configured to feed back output information to the control unit 1 (reference numeral 30).

As shown in FIG. 1, the AC/DC converter is connected to the AC input and is composed of a filter circuit 12, a diode rectification bridge 14, etc.

DC/DC converter 13 is provided with a configuration of a diode rectification system, a capacitor C3 is connected between a DC input line and a ground potential, and a capacitor C2 is connected between a DC output line and the ground potential.

A capacitor, a photo coupler, a transformer, etc. is applicable to the insulation circuit 20. As usage, a bidirectional transformer having an insulated driver, a bilateral device, etc. may also be applied thereto.

The PD device 1A according to the comparative example 1 can change the AC input to the desired voltage value to be output as the DC output by controlling a feedback signal of the control unit 2 (reference numeral 18). However, according to the PD device according to the comparative example 1, since the output voltage is obtained using the transformer 15 previously optimized to a predetermined output voltage, power efficiency also becomes more deteriorated as the difference between the predetermined voltage (fitting voltage) by which the transformer is optimized, and the desired voltage becomes larger. Therefore, it is difficult to realize satisfactory power efficiency over a wide output voltage range.

Comparative Example 2

Figure 2:
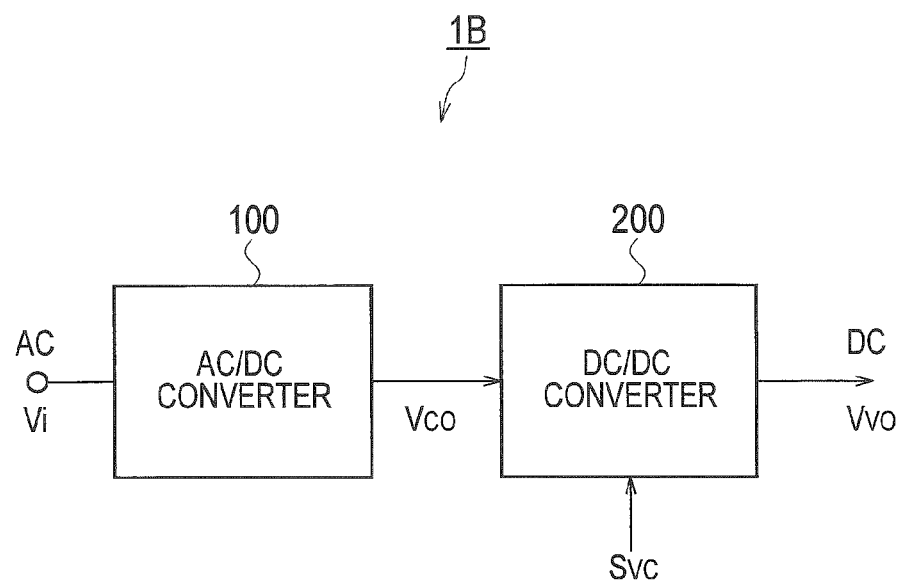
FIG. 2 is a schematic block configuration diagram of a PD device according to a comparative example 2.

As exemplified in FIG. 2, a PD device 1B according to a comparative example 2 includes: an AC/DC converter 100 connected to an AC input; and a DC/DC converter 200 connected between the AC/DC converter 100 and a DC output. The AC/DC converter 100 may have the same internal configuration as that of the PD device 1A accorded to the comparative example 1 shown in FIG. 1, for example.

In the PD device 1B according to the comparative example 2, the AC/DC converter 100 generates the maximum voltage from an AC input $V_i$ to be output as DC output voltage (fixed value) $V_{CO}$. The DC/DC converter 200 variably outputs the DC output voltage (fixed value) $V_{CO}$ output from the AC/DC converter 100 as desired DC variable output voltage $V_{VO}$ in accordance with a voltage changing control signal $S_{VC}$ supplied from the outside.

However, in the PD device 1B according to the comparative example 2, since power efficiency becomes deteriorated if a duty cycle ratio varied in accordance with output voltage is biased, it is difficult to realize satisfactory power efficiency over all of the wide output voltage range.

Figure 3A:
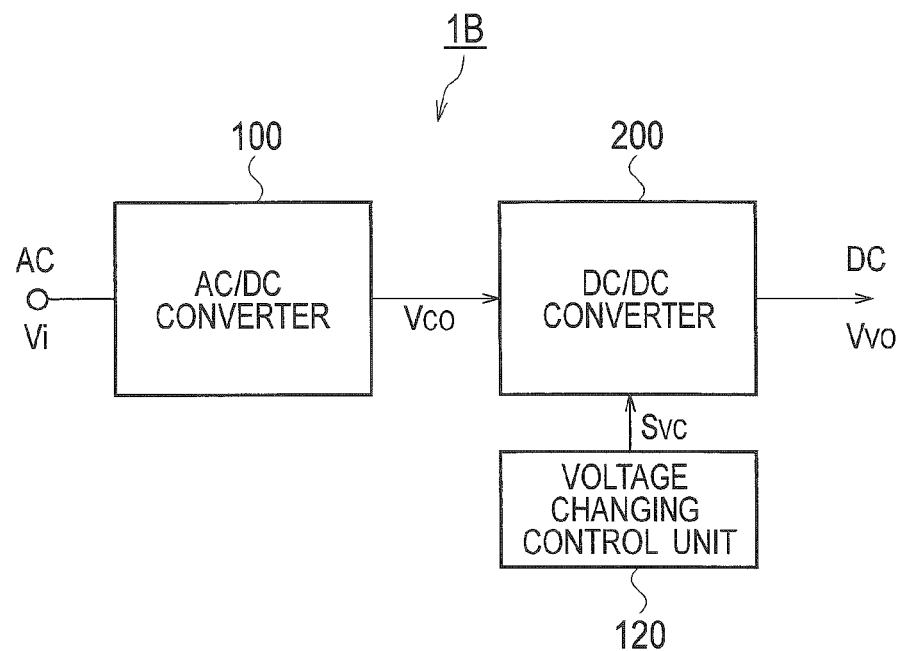
FIG. 3A is a schematic block configuration diagram of a PD device according to a modified example 1 of the comparative example 2.

As exemplified in FIG. 3A, the PD device 1B according to a modified example 1 of the comparative example 2 includes: an AC/DC converter 100 connected to an AC input; a DC/DC converter 200 connected between the AC/DC converter 100 and a DC output; and a voltage changing control unit 120 configured to supply the voltage changing control signal $S_{VC}$ to the DC/DC converter 200.

Figure 3B:
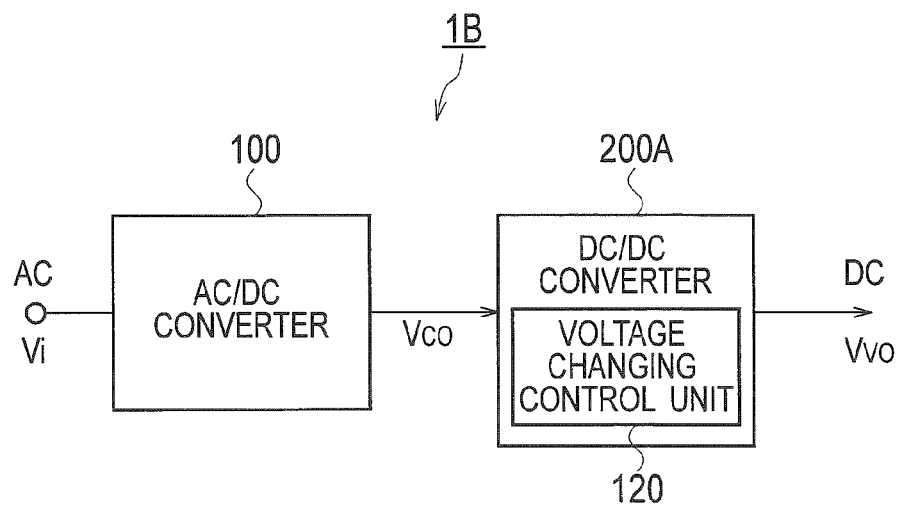
FIG. 3B is a schematic block configuration diagram of a PD device according to a modified example 2 of the comparative example 2.

Moreover, as exemplified in FIG. 3B, the PD device 1B according to a modified example 2 of the comparative example 2, the voltage changing control unit 120 configured to supply the voltage changing control signal $S_{VC}$ is integrated into the inside of the DC/DC converter 200A.

In also the PD device 1B according to the modified examples 1 and 2 of the comparative example 2, the AC/DC converter 100 generates the maximum voltage from an AC input $V_i$ to be output as DC output voltage (fixed value) $V_{CO}$. The DC/DC converter 200A variably outputs the DC output voltage (fixed value) $V_{CO}$ output from the AC/DC converter 100 as desired DC variable output voltage $V_{VO}$ in accordance with a voltage changing control signal $S_{VC}$ supplied from the voltage changing control unit 120.

However, in the PD device 1B according to the modified examples 1 and 2 of the comparative example 2, since power efficiency becomes deteriorated if the duty cycle ratio varied in accordance with output voltage is biased, it is difficult to realize satisfactory power efficiency over the wide output voltage range.

First Embodiment

Figure 4:
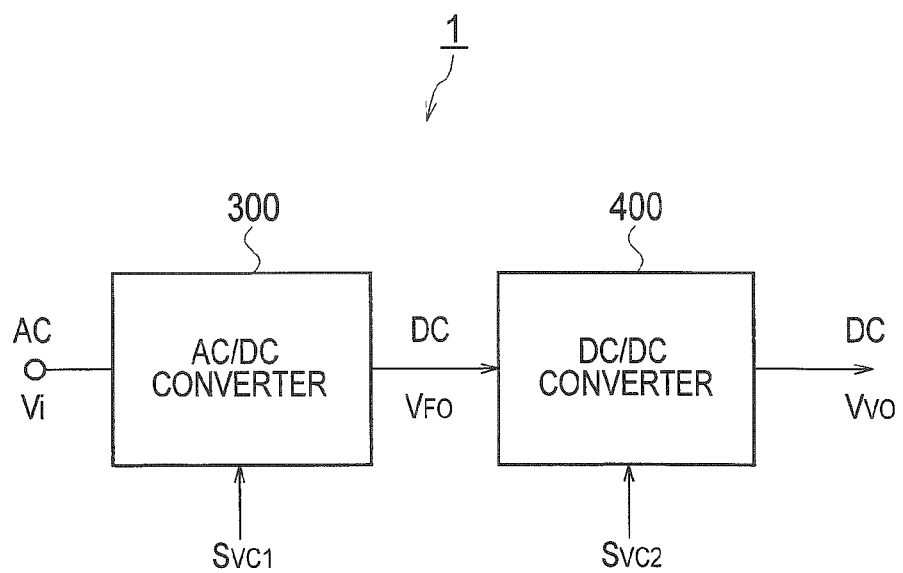
FIG. 4 is a schematic block configuration diagram of a PD device according to a first embodiment.

As exemplified in FIG. 4, a PD device 1 according to a first embodiment includes: an AC/DC converter 300 connected to an AC input, the AC/DC converter 300 configured to change the AC input $V_i$ to desired DC output voltage (fixed value) $V_{FO}$ to be output in accordance with a voltage changing control signal $S_{VC1}$ supplied from the outside; and a DC/DC converter 400 connected between an output of the AC/DC converter 300 and a DC output, the DC/DC converter 400 configured to variably output the DC output voltage (fixed value) $V_{FO}$ supplied from the AC/DC converter 300 as desired DC variable output voltage $V_{VO}$ in accordance with a voltage changing control signal $S_{VC2}$ supplied from the outside, wherein the AC/DC converter 300 at a previous stage and the DC/DC converter 400 at a subsequent stage are interlocked with each other to change the DC variable output voltage $V_{VO}$ to desired target voltage.

More specifically, the AC/DC converter 300 changes the AC input $V_i$ to the desired DC voltage value in accordance with the voltage changing control signal $S_{VC1}$ supplied from the outside, and then outputs the desired DC voltage as the DC output voltage (fixed value) $V_{FO}$. The DC/DC converter 400 changes the DC output voltage (fixed value) $V_{FO}$ supplied from the AC/DC converter 300 to the desired DC variable output voltage $V_{VO}$ in accordance with the voltage changing control signal $S_{VC2}$ supplied from the outside, and then outputs the desired DC variable output voltage $V_{VO}$. In this manner, the AC/DC converter 300 at the previous stage and the DC/DC converter 400 at the subsequent stage can be interlocked with each other to change the DC variable output voltage $V_{VO}$ to the desired target voltage.

In addition, the PD device 1 according to the first embodiment can also be used as a variable source device provided with a communication facility for delivering the power of output voltage values according to peripheral devices using a power line as a communication transmission line.

Figure 5A:
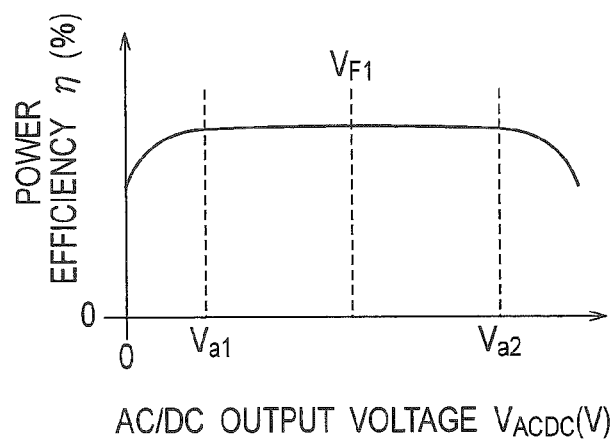
FIG. 5A is a diagram for exemplifying a relationship between output voltage and power efficiency in the PD device according to the first embodiment, and shows in particular the relationship between output voltage and power efficiency in an AC/DC converter 300 shown in FIG. 4.
Figure 5B:
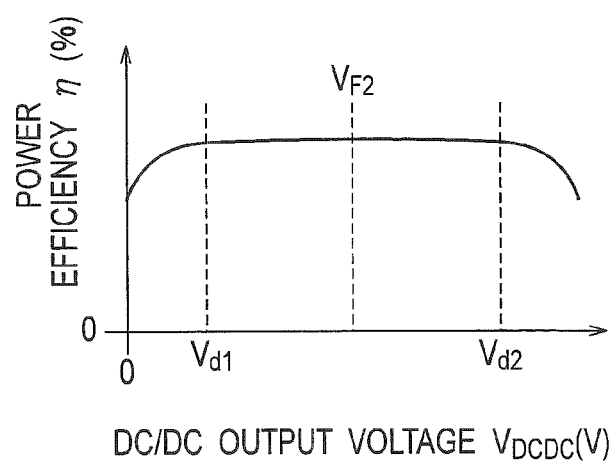
FIG. 5B shows a relationship between output voltage and power efficiency in the DC/DC converter 400 shown in FIG. 4.

As exemplified in FIG. 5A, the AC/DC converter 300 can deliver the power with high power efficiency over a range from voltage $V_{a1}$ to voltage $V_{a2}$ including the predetermined voltage (fitting voltage $V_{F1}$) by which the transformer is optimized. On the other hand, as exemplified in FIG. 5B, the DC/DC converter 400 can deliver the power with high power efficiency over a range from voltage $V_{d1}$ to voltage $V_{d2}$ including the predetermined voltage (fitting voltage $V_{F2}$). Accordingly, the AC/DC converter 300 at the previous stage and the DC/DC converter 400 at the subsequent stage are interlocked with each other to change the output voltage to the desired target voltage, and the AC/DC converter 300 and the DC/DC converter 400 make a good complement to each other with a part having high efficiency in each converter, and thereby achieving satisfactory power efficiency and reducing efficiency deterioration over the wide output voltage range $\Delta V_0 = V_{e1}$ to $V_{e2}$, as shown in the curved line A of FIG. 7. In addition, in FIG. 7, the curved line B indicates a relationship between output voltage and power efficiency in the PD device according to the comparative example 2, and the curved line C indicates a relationship between output voltage and power efficiency in the PD device according to the comparative example 1. As clearly from FIG. 7, according to the PD device 1 according to the first embodiment, compared with the PD device 1A according to the comparative example 1 or the PD device 1B according to the comparative example 2, the power can be delivered with high power efficiency over the wider output voltage range $\Delta V_0 = V_{e1}$ to $V_2$.

Modified Example 1

Figure 6A:
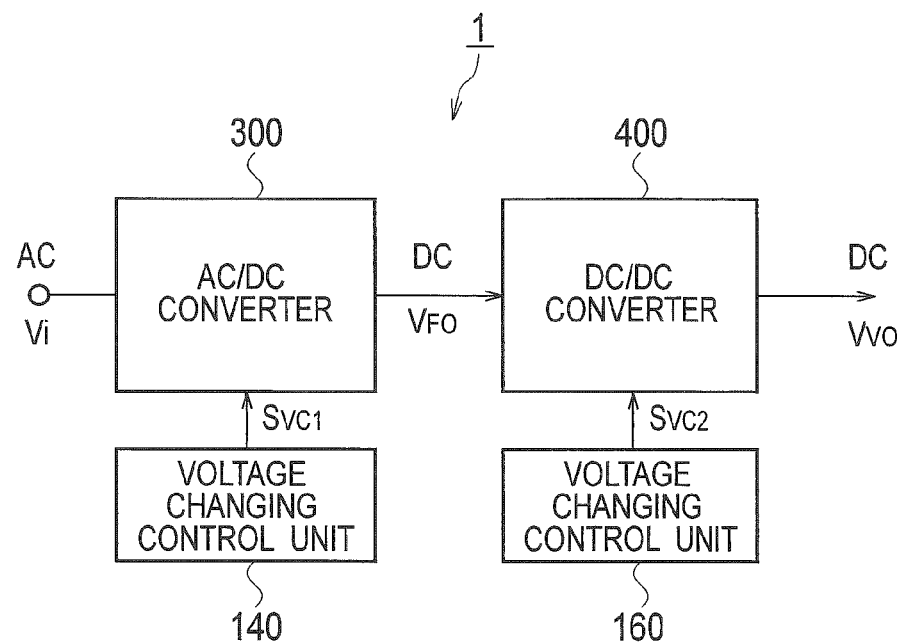
FIG. 6A is a schematic block configuration diagram of a PD device according to a modified example 1 of the first embodiment.

As exemplified in FIG. 6A, a PD device 1 according to a modified example 1 of the first embodiment includes: an AC/DC converter 300 connected to an AC input; a DC/DC converter 400 connected between an output of the AC/DC converter 300 and a DC output; a voltage changing control unit 140 configured to supply a voltage changing control signal $S_{VC1}$ to the AC/DC converter 300; and a voltage changing control unit 160 configured to supply a voltage changing control signal $S_{VC2}$ to the DC/DC converter 400.

The PD device 1 according to the modified example 1 of the first embodiment is configured to interlock between the AC/DC converter 300 at the previous stage and the DC/DC converter 400 at the subsequent stage to change output voltage to desired target voltage. More specifically, the AC/DC converter 300 changes the AC input $V_i$ to the desired voltage value in accordance with the voltage changing control signal $S_{VC1}$ supplied from the voltage changing control unit 140, and then outputs the desired DC voltage as the DC output voltage (fixed value) $V_{FO}$. The DC/DC converter 400 changes the DC output voltage (fixed value) $V_{FO}$ supplied from the AC/DC converter 300 to the desired DC variable output voltage $V_{VO}$ in accordance with the voltage changing control signal $S_{VC2}$ supplied from the voltage changing control unit 160, and then outputs the desired DC variable output voltage $V_{VO}$. In this manner, the AC/DC converter 300 at the previous stage and the DC/DC converter 400 at the subsequent stage can be interlocked with each other to change the DC variable output voltage $V_{VO}$ to the desired target voltage.

Figure 7:
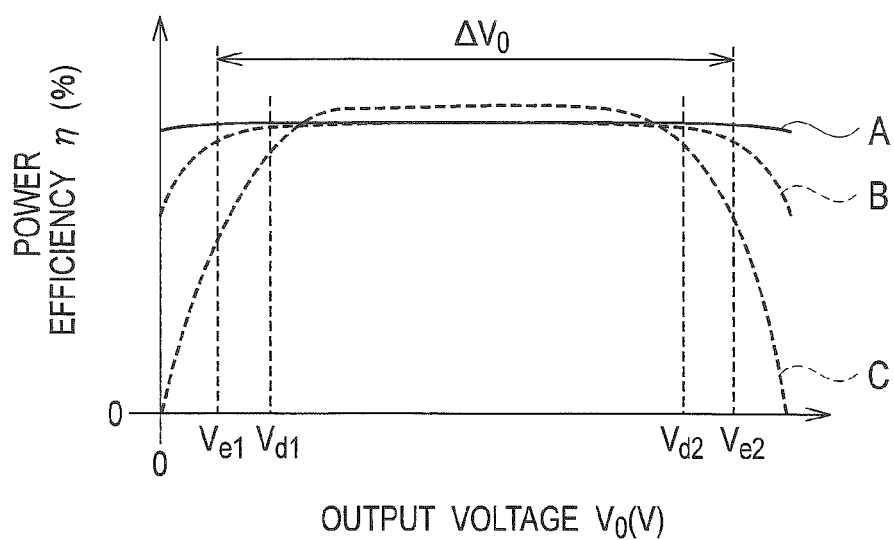
FIG. 7 is a diagram for exemplifying a relationship between output voltage and power efficiency in each of the PD devices according to the comparative examples 1 and 2 and the PD device according to the first embodiment.

According to the PD device according to the modified example 1 of the first embodiment, the AC/DC converter 300 at the previous stage and the DC/DC converter 400 at the subsequent stage are interlocked with each other to change the output voltage to the desired target voltage, and the AC/DC converter 300 and the DC/DC converter 400 make a good complement to each other with a part having high efficiency in each converter, and thereby achieving satisfactory power efficiency and reducing efficiency deterioration over the wide output voltage range from Ve1 to Ve2, as shown in the curved line A of FIG. 7.

Modified Example 2

Figure 6B:
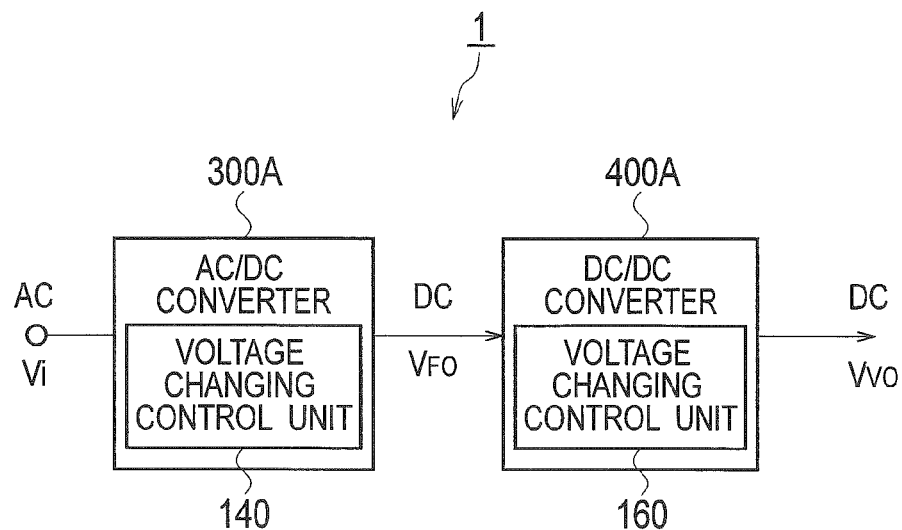
FIG. 6B is a schematic block configuration diagram of a PD device according to a modified example 2 of the first embodiment.

As exemplified in FIG. 6B, a PD device 1 according to a modified example 2 of the first embodiment includes: an AC/DC converter 300A connected to an AC input; and a DC/DC converter 400A connected between an output of the AC/DC converter 300A and a DC output. The AC/DC converter 300A includes a voltage changing control unit 140 configured to supply a voltage changing control signal $S_{VC1}$ to the AC/DC converter 300A, and the DC/DC converter 400A includes a voltage changing control unit 160 configured to supply a voltage changing control signal $S_{VC2}$ to the DC/DC converter 400A. More specifically, the configuration of the PD device 1 according to a modified example 2 of the first embodiment is the same as that of the PD device 1 according to the modified example 1 of the first embodiment, except that the voltage changing control unit 140 is integrated into the inside of the AC/DC converter 300A of, and the voltage changing control unit 160 is integrated into the inside of the DC/DC converter 400A.

Thus, the voltage changing control unit 140 can be integrated into the AC/DC converter 300A, and/or the voltage changing control unit 160 can be integrated into the DC/DC converter 400A, and thereby can also be composed as an Integrated Circuit (IC).

The PD device 1 according to the modified example 2 of the first embodiment is also configured to interlock between the AC/DC converter 300 at the previous stage and the DC/DC converter 400 at the subsequent stage to change output voltage to desired target voltage. More specifically, the AC/DC converter 300 changes the AC input Vi to the desired voltage value in accordance with the voltage changing control signal $S_{VC1}$ supplied from the voltage changing control unit 140, and then outputs the desired DC voltage as the DC output voltage (fixed value) $V_{FO}$. The DC/DC converter 400 changes the DC output voltage (fixed value) $V_{FO}$ supplied from the AC/DC converter 300 to the desired DC variable output voltage $V_{VO}$ in accordance with the voltage changing control signal $S_{VC2}$ supplied from the voltage changing control unit 160, and then outputs the desired DC variable output voltage $V_{VO}$. In this manner, the AC/DC converter 300 at the previous stage and the DC/DC converter 400 at the subsequent stage can be interlocked with each other to change the DC variable output voltage $V_{VO}$ to the desired target voltage.

According to the PD device according to the modified example 2 of the first embodiment, the AC/DC converter 300 at the previous stage and the DC/DC converter 400 at the subsequent stage are interlocked with each other to change the output voltage to the desired target voltage, and the AC/DC converter 300 and the DC/DC converter 400 make a good complement to each other with a part having high efficiency in each converter, And thereby achieving satisfactory power efficiency over the wide output voltage range from $V_{e1}$ to $V_{e2}$, as shown in the curved line A of FIG. 7.

According to the PD device according to the first embodiment and its modified examples, the AC/DC converter 300 at the previous stage and the DC/DC converter 400 at the subsequent stage make the good complement to each other with a part having high efficiency in each converter, and thereby satisfactory power efficiency over the wide output voltage range can be achieved.

According to the first embodiment and its modified examples, there can be provided the PD device capable of delivering the power with high power efficiency over the wide voltage ranges.

Second Embodiment

Figure 8:
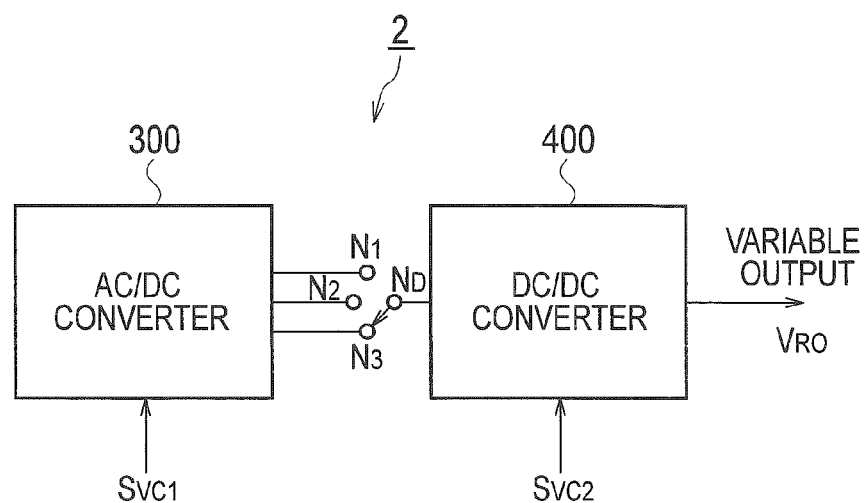
FIG. 8 is a schematic block configuration diagram of a PD device according to a second embodiment.

As exemplified in FIG. 8, a PD device 2 according to a second embodiment includes: an AC/DC converter 300 connected to an AC input, the AC/DC converter 300 configured to change the AC input to the predetermined number of desired voltage values to be output to multiport outputs ($N_1$ to $N_3$) in accordance with a voltage changing control signal $S_{VC1}$; and a DC/DC converter 400 connected between the multiport outputs of the AC/DC converter 300 and a DC output, the DC/DC converter 400 configured to selectively input optimum voltage from among the multiport outputs of the AC/DC converter 300, and then change the optimum voltage to desired DC variable output voltage $V_{RO}$ to be output as a DC output in accordance with a voltage changing control signal $S_{VC2}$, wherein the AC/DC converter 300 at a previous stage and the DC/DC converter 400 at a subsequent stage are interlocked with each other to change the output voltage to desired target voltage.

More specifically, the AC/DC converter 300 changes the AC input to the predetermined number of the desired voltage values (three values respectively corresponding to the multiport outputs ($N_1$ to $N_3$) in an example shown in FIG. 8) in accordance with the voltage changing control signal $S_{VC1}$ supplied from the outside, and then outputs the desired voltages as a DC output (multiple values) through the multiport outputs (N1 to N3) (multiport outputs). The DC/DC converter 400 selectively inputs the optimum voltage for the DC/DC converter 400 from among the multiport outputs ($N_1$-$N_3$) output from the AC/DC converter 300 (multiport outputs selection), and then changes the optimum voltage to the desired DC variable output voltage $V_{RO}$ to be output, in accordance with the voltage changing control signal $S_{VC2}$ supplied from the outside. In this manner, the AC/DC converter 300 at the previous stage and the DC/DC converter 400 at the subsequent stage can be interlocked with each other to change the output voltage to the desired target voltage.

Modified Example

Figure 9:
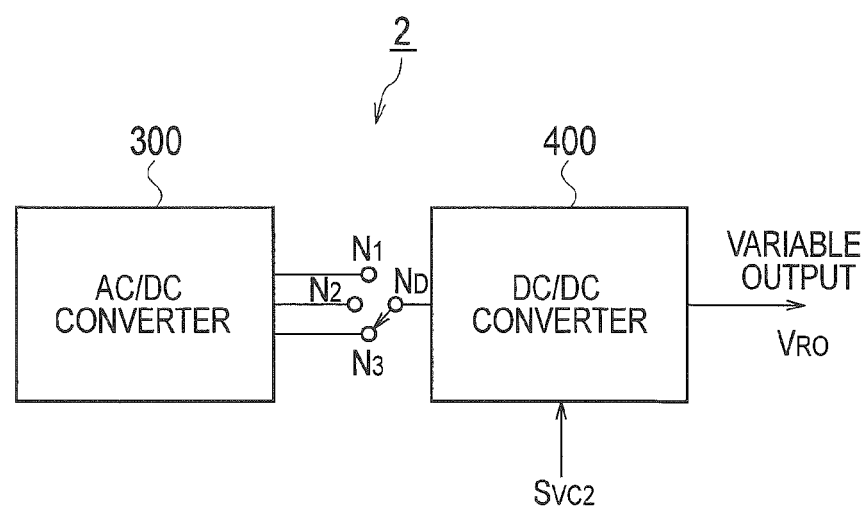
FIG. 9 is a schematic block configuration diagram of a PD device according to a modified example of the second embodiment.

As exemplified in FIG. 9, a schematic block configuration of a PD device 2 according to a modified example of the second embodiment includes:

an AC/DC converter 300 connected to an AC input, the AC/DC converter 300 configured to change the AC input to the predetermined number of predetermined voltage value to be output to multiport outputs; and a DC/DC converter 400 connected between the multiport outputs of the AC/DC converter 300 and a DC output, the DC/DC converter 400 configured to selectively input optimum voltage from among the multiport outputs of the AC/DC converter 300, and then change the optimum voltage to desired DC variable output voltage $V_{RO}$ in accordance with a voltage changing control signal $S_{VC2}$, and then output the desired DC variable output voltage as a DC output, wherein the AC/DC converter 300 at a previous stage and the DC/DC converter 400 at a subsequent stage are interlocked with each other to change the output voltage to desired target voltage.

More specifically, the AC/DC converter 300 changes the AC input to the predetermined number of the predetermined voltage values (three values respectively corresponding to the multiport outputs ($N_1$ to $N_3$) in an example shown in FIG. 9), and then output the predetermined voltage as the DC output (multiple values) through the multiport outputs ($N_1$ to $N_3$). The DC/DC converter 400 selectively inputs the optimum voltage for the DC/DC converter 400 from among the multiport outputs (N1-N3) output from the AC/DC converter 300 (multiport outputs selection), and then changes the optimum voltage to the desired DC variable output voltage $V_{RO}$ to be output as the DC output, in accordance with the voltage changing control signal $S_{VC2}$ supplied from the outside. In this manner, the AC/DC converter 300 at the previous stage and the DC/DC converter 400 at the subsequent stage can be interlocked with each other to change the output voltage to the desired target voltage.

In addition, the PD device 2 according to the second embodiment and its modified example can also be used as a variable source device provided with a communication facility for delivering the power of output voltage values according to peripheral devices using a power line as a communication transmission line.

Figure 10:
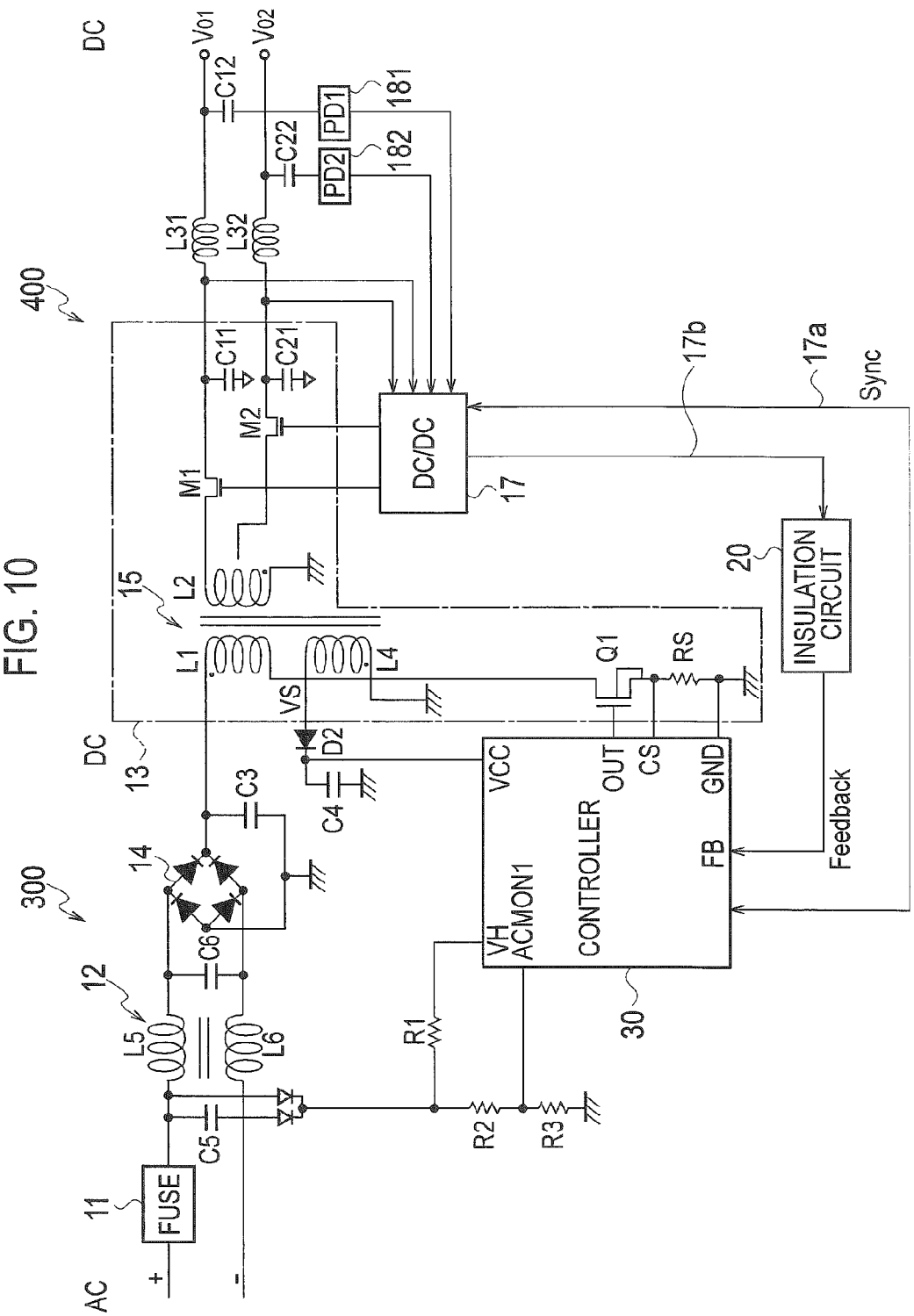
FIG. 10 is a schematic circuit block configuration diagram for explaining an example of a multiport output/selection of the PD device according to the second embodiment.

A schematic circuit block configuration for explaining an example (example of two values) of the multiport output/selection of the PD device 2 according to the second embodiment is exemplified by FIG. 10.

As shown in FIG. 10, the PD device 2 accorded to the second embodiment includes an AC/DC converter 300 connected to an AC input, the AC/DC converter 300 composed of a fuse 11, a choke coil 12, a diode rectification bridge 14, capacitors C5, C6, C3.

Moreover, an auxiliary inductance L4 composed of the primary-side auxiliary winding in the transformer 15, and a diode D2 and a capacitor C4 connected in parallel to the auxiliary inductance L4 are provided therein, and the DC voltage VCC is supplied from the capacitor C4 to the primary-side controller 30.

Furthermore, as shown in FIG. 10, the PD device 2 accorded to the second embodiment includes: a synchronous rectification type DC/DC converter 13 capable of supporting the multiport outputs disposed between an output of AC/DC converter and an output, the DC/DC converter 13 composed of a transformer 15, MOS transistors M1 and M2, capacitors C11 and C12, and a MOS transistor Q1 and a resistor RS connected in series between a primary-side inductance L1 of the transformer 15 and a ground potential; secondary-side controllers (PD1) 181 and (PD2) 182 connected to the primary-side controller 30 configured to control the MOS transistor Q1 through capacitors C12 and C22 at the output, the secondary-side controllers (PD1) 181 and (PD2) 182 capable of controlling output voltages $V_{O1}$ and $V_{O2}$ and output currents $I_{O1}$ and $I_{O2}$; a control DC/DC converter 17 connected to the secondary-side controllers 181 and 182, and connected to the multiport outputs of the DC/DC converter 13, the control DC/DC converter 17 configured to control to feed back multi output information to the primary-side controller 30; and an insulation circuit 20 connected to the control DC/DC converter 17 for control, the insulation circuit 20 configured to feed back the multi output information to the primary-side controller 30.

The control DC/DC converter 17 for control is connected to gates of the MOS transistors M1 and M2 of the synchronous rectifying type DC/DC converter 13 capable of supporting multiport outputs, and can constantly hold the output voltages $V_{O1}$ and $V_{O2}$ by controlling the MOS transistors M1 and M2.

If the outputs are extracted from the secondary-side inductance L2 of the transformer 15 in the DC/DC converter 13 in multi-tap form when there are a plurality of the output ports (i.e., multiport outputs), output voltages of the multiport is dependent on the number ratio of turns of the secondary-side inductance L2 and a proportion of the feedback to the input side of the DC/DC converter 13. Accordingly, although it is difficult to constantly hold the voltages of multiport outputs, the output voltages $V_{O1}$ and $V_{O2}$ can be constantly held by controlling the MOS transistors M1 and M2 of the synchronous rectifying type DC/DC converter 13 capable of supporting multiport outputs in the constructional example of FIG. 10.

Moreover, a synchronizing signal can be bidirectionally transmitted between control DC/DC converter 17 and the primary-side controller 30 through a connection line 17a disposed between the control DC/DC converter 17 and the primary-side controller 30.

Moreover only output power information is fed back from the control DC/DC converter 17 to the primary-side controller 30 via the insulation circuit 20 through the connection line 17b disposed between the control DC/DC converter 17 and the insulation circuit 20.

Since the constructional example of FIG. 10 adopts a synchronizing rectification method to the DC/DC converter 13, DC/DC power conversion efficiency can be improved, thereby supporting the multiport outputs.

Figure 11:
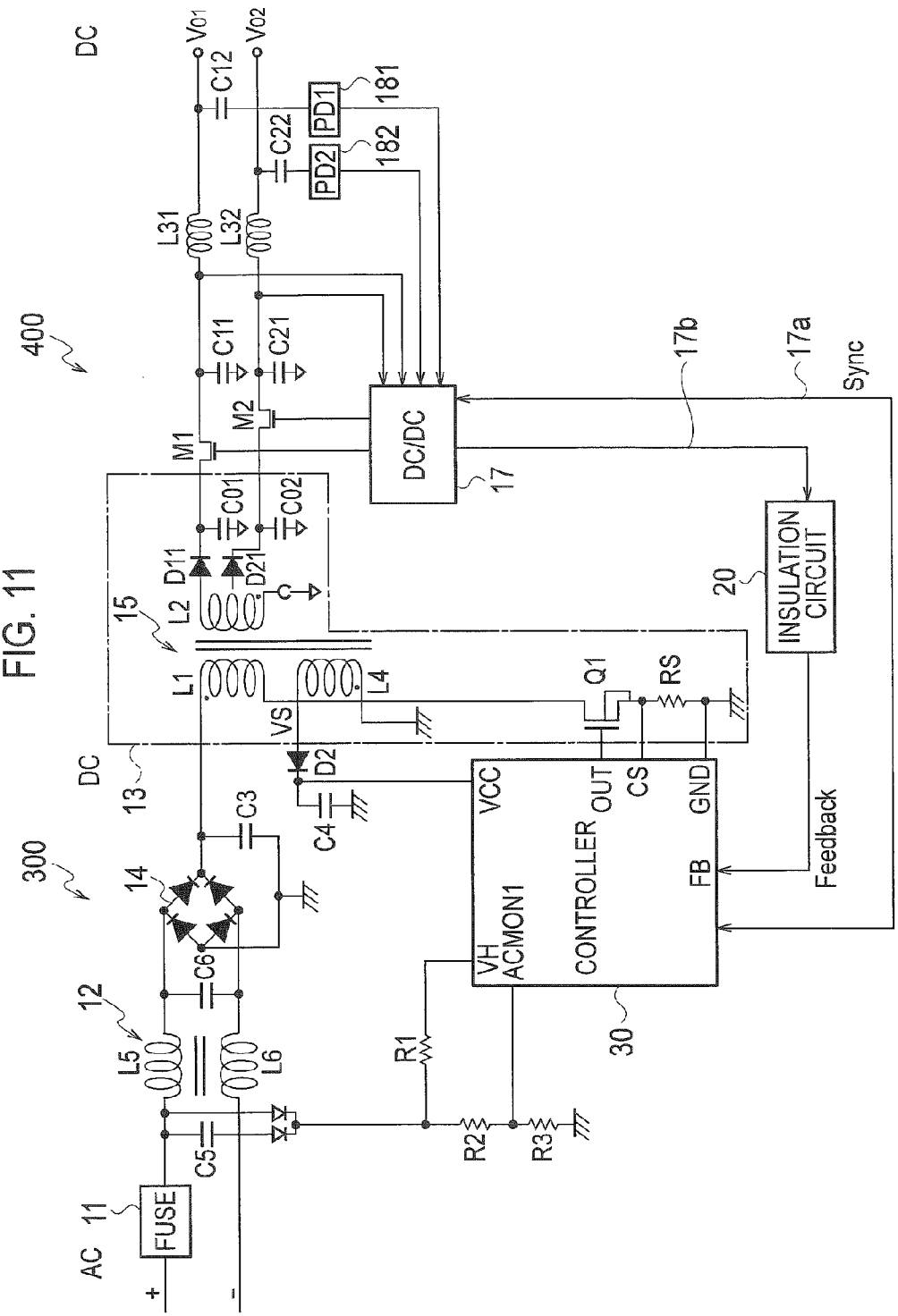
FIG. 11 is an alternative schematic circuit block configuration diagram for explaining the example of the multiport output/selection of the PD device according to the second embodiment.

FIG. 11 exemplifies an alternative schematic circuit block configuration for explaining an example (example of two values) of the multiport output/selection of the PD device according to the second embodiment.

As shown in FIG. 11, the PD device includes an AC/DC converter connected to an AC input and composed of a fuse 11, a choke coil 12, a diode rectification bridge 14, capacitors C5, C6 and C3, etc.

Moreover, the PD device includes: an auxiliary inductance L4 composed of a primary-side auxiliary winding of the transformer 15; and a diode D2 and a capacitor C4 *b* connected in parallel to the auxiliary inductance L4, and DC voltage VCC is supplied from the capacitor C4 to the primary-side controller 30.

Furthermore, as shown in FIG. 11, the PD device 2 includes: a diode rectification type DC/DC converter 13 capable of supporting the multiport outputs disposed between an output of AC/DC converter and an output, the DC/DC converter 13 composed of a transformer 15, diodes D11 and D12, capacitors C01 and C02, and a MOS transistor Q1 and a resistor RS connected in series between a primary-side inductance L1 of the transformer 15 and a ground potential; secondary-side controllers (PD1) 181 and (PD2) 182 connected to the primary-side controller 30 configured to control the MOS transistor Q1 through capacitors C12 and C22 at the output, the secondary-side controllers (PD1) 181 and (PD2) 182 capable of controlling output voltages $V_{O1}$ and $V_{O2}$ and output currents $I_{O1}$ and $I_{O2}$; a control DC/DC converter 17 connected to the secondary-side controllers 181 and 182, and connected to the multiport outputs of the DC/DC converter 13, the control DC/DC converter 17 configured to control to feed back multi output information to the primary-side controller 30; and an insulation circuit 20 connected to the control DC/DC converter 17 for control, the insulation circuit 20 configured to feed back the multi output information to the primary-side controller 30

Furthermore, as shown in FIG. 11, the PD device 2 includes MOS transistors M1 and M2 connected between an output of the DC/DC converter 13 and the multiport outputs.

The control DC/DC converter 17 is connected to gates of the MOS transistors M1 and M2, and can constantly hold output voltages $V_{O1}$ and $V_{O2}$ by controlling the MOS transistors M1 and M2. Other configurations of FIG. 11 are the same as those of FIG. 10.

Also, the PD device according to the second embodiment may include a voltage changing control unit 140 configured to supply a voltage changing control signal $S_{VC1}$ to the AC/DC converter 300, and a voltage changing control unit 160 configured to supply a voltage changing control signal $S_{VC2}$ to the DC/DC converter 400 in the similar manner as that of the PD device according to the modified example 1 of the first embodiment, or the voltage changing control unit 140 may be integrated inside of the AC/DC converter 300, and the voltage changing control unit 160 may be integrated inside of the DC/DC converter 400 in the similar manner as that of the PD device according to the modified example 2 of the first embodiment.

Moreover, although the second embodiment shows the example of the multiport output/selection with two values or three values, the number of the multiport outputs is not limited to the above-mentioned example, but may be modified as required.

According to the PD device according to the second embodiment and its modified example, the AC/DC converter capable of multiport output at the previous stage and the DC/DC converter capable of multiport output at the subsequent stage make the good complement to each other with a part having high efficiency in each converter, and thereby satisfactory power efficiency over the wide output voltage range can be achieved.

According to the second embodiment and its modified examples, there can be provided the PD device capable of delivering the power with high power efficiency over the wide voltage ranges.

Moreover, there can also be provided an AC adapter mounting the PD device according to the first or second embodiment. According to the AC adapter mounting the PD device according to the first or second embodiment, the power can be delivered over the wide voltage ranges with high power efficiency.

Moreover, there can also be provided the AC adapter capable of supporting the multiport outputs which can realize satisfactory power efficiency over the wide output voltage ranges.

Electronic apparatuses capable of mounting the PD device according to the first or second embodiment includes monitors, external hard disk drives, set top boxes, personal computers (PCs), laptop PCs, tablet PCs, smart phones, battery charger systems, displays, printers, cleaners, refrigerators, facsimile machines, telephones, etc.

Moreover, the PD device according to the first or second embodiment is not limited to the flyback DC/DC converters, but can be applied also in feedforward DC/DC converters.

As mentioned above, the embodiments described herein can provide the PD device capable of delivering power with high power efficiency over the wide voltage ranges, and can further provide the AC adapter and the electronic apparatus, each mounted with such a PD device.

Other Embodiments

The embodiments have been described herein, as a disclosure including associated description and drawings to be construed as illustrative, not restrictive. This disclosure makes clear a variety of alternative embodiments, working examples, and operational techniques for those skilled in the art.

Such being the case, the embodiments cover a variety of embodiments and the like, whether described or not.

What is claimed is:

1. An electronic apparatus mounted with a power delivery device, the power delivery device comprising:
    an AC/DC converter connected to an AC input terminal, the AC/DC converter configured to change an AC input voltage to a first desired voltage value to be output from a first output terminal in accordance with a first voltage changing control signal, the first voltage changing control signal output from a primary-side controller;
    a DC/DC converter connected the first output terminal of the AC/DC converter, the DC/DC converter configured to change the output from the AC/DC converter to a second desired voltage value to be output as a DC output voltage from a DC output voltage terminal in accordance with a second voltage changing control signal;
    capacitors each having a first end and a second end, the first ends of the capacitors being connected to the DC output voltage terminal;
    secondary-side controllers respectively connected to the second ends of the capacitors, the secondary-side controllers capable of controlling the DC output voltage;
    a control DC/DC converter connected to the secondary-side controllers, the control DC/DC converter connected to transistors disposed in the DC/DC converter, the control DC/DC converter capable of constantly holding the DC output voltage by controlling the transistors; and
    a connection line having a first end connected to the control DC/DC converter and a second end connected to the primary-side controller, the connection line being used for bidirectionally transmitting a synchronous signal to the control DC/DC converter and the primary-side controller, wherein
    the AC/DC converter and the DC/DC converter are interlocked with each other to change the DC output voltage to a desired target voltage.

2. A power delivery device comprising:
    an AC/DC converter connected to an AC input terminal, the AC/DC converter configured to change an AC input voltage to a first desired voltage value to be output from a first output terminal in accordance with a first voltage changing control signal, the first voltage changing control signal output from a primary-side controller;
    a DC/DC converter connected the first output terminal of the AC/DC converter, the DC/DC converter configured to change the output from the AC/DC converter to a second desired voltage value to be output as a DC output voltage from a DC output voltage terminal in accordance with a second voltage changing control signal;
    capacitors each having a first end and a second end, the first ends of the capacitors being connected to the DC output voltage terminal;
    secondary-side controllers respectively connected to the second ends of the capacitors, the secondary-side controllers capable of controlling the DC output voltage;
    a control DC/DC converter connected to the secondary-side controllers, the control DC/DC converter connected to transistors disposed in the DC/DC converter, the control DC/DC converter capable of constantly holding the DC output voltage by controlling the transistors; and
    a connection line having a first end connected to the control DC/DC converter and a second end connected to the primary-side controller, the connection line being used for bidirectionally transmitting a synchronous signal to the control DC/DC converter and the primary-side controller, wherein
    the AC/DC converter and the DC/DC converter are interlocked with each other to change the DC output voltage to a desired target voltage.

3. The power delivery device according to claim 2, wherein
    the first voltage changing control signal is supplied to the AC/DC converter from outside of the AC/DC converter, and the second voltage changing control signal is supplied to the DC/DC converter from outside of the DC/DC converter.

4. The power delivery device according to claim 2, further comprising:

a first voltage changing control unit configured to supply the first voltage changing control signal to the AC/DC converter; and a second voltage changing control unit configured to supply the second voltage changing control signal to the DC/DC converter.

5. The power delivery device according to claim 2, wherein the AC/DC converter comprises a first voltage changing control unit configured to supply the first voltage changing control signal, and the DC/DC converter comprises a second voltage changing control unit configured to supply the second voltage changing control signal.

6. The electronic apparatus according to claim 1, wherein the electronic apparatus is an apparatus selected from the group consisting of a monitor, an external hard disk drive, a set top box, a laptop personal computer, a tablet personal computer, a smart phone, a battery charger system, a personal computer, a display, a printer, a cleaner, a refrigerator, a facsimile machine, and a telephone.

\* \* \* \* \*